(12) United States Patent
Guo (10) Patent No.: US 9,497,575 B2
(45) Date of Patent: Nov. 15, 2016

(54) FIRST DEVICE, SYSTEM AND METHOD TO COMMUNICATE WITH SECOND DEVICE

(71) Applicant: Beijing Guochengwantong Information Technology Co. Ltd., Beijing (CN)

(72) Inventor: Cheng Guo, Beijing (CN)

(73) Assignee: BEIJING GUOCHENGWANTONG INFORMATION TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 14/697,643

(22) Filed: Apr. 28, 2015

(65) Prior Publication Data

US 2016/0134997 A1    May 12, 2016

(30) Foreign Application Priority Data

Nov. 12, 2014   (CN) .......................... 2014 1 0645485

(51) Int. Cl.
| | | |
|---|---|---|
| H04W 4/00 | (2009.01) | |
| H04L 29/08 | (2006.01) | |
| H04W 76/04 | (2009.01) | |

(52) U.S. Cl.
CPC .............. *H04W 4/008* (2013.01); *H04L 67/10* (2013.01); *H04W 76/043* (2013.01)

(58) Field of Classification Search
USPC .......... 455/41.2, 435.1, 41.3, 552.1; 370/216
See application file for complete search history.

(56) References Cited

U.S. PATENT DOCUMENTS

| | | | | |
|---|---|---|---|---|
| 2011/0183614 A1* | 7/2011 | Tamura | ............... | H04M 1/7253 455/41.2 |
| 2014/0071807 A1* | 3/2014 | Tohzaka | ............... | H04W 24/04 370/216 |
| 2014/0106677 A1* | 4/2014 | Altman | ............... | H04B 1/3827 455/41.2 |
| 2014/0128063 A1* | 5/2014 | Chhabra | ........... | H04M 15/7652 455/435.1 |
| 2014/0181683 A1* | 6/2014 | Lim | ...................... | H04L 63/105 715/740 |

\* cited by examiner

*Primary Examiner* — Ganiyu A Hanidu
(74) *Attorney, Agent, or Firm* — Treasure IP Group, LLC (57) ABSTRACT

The present invention provides a communication method and a communication system between a first computing device and a second computing device. In response to link disconnection of a first communication link mode between the first computing device and the second computing device, data from the second computing device is received from a server, and/or data addressed to the second computing device is transmitted to the server by a second communication link mode. Accordingly, a seamless connection between the first computing device and the second computing device can be established even if they are positioned so far away from each other that the connection of the first communication link mode between the two has been disconnected.

20 Claims, 7 Drawing Sheets

FIRST DEVICE, SYSTEM AND METHOD TO COMMUNICATE WITH SECOND DEVICE

CROSS-REFERENCE TO RELATED APPLICATION

This application claims priority to Chinese Application No. CN 201410645485.X, filed on Nov. 12, 2014. The Chinese Application is incorporated herein by reference in its entirety.

FIELD OF THE INVENTION

The present invention relates to the technical field of communication, particularly, to communication devices, a communication method between communication devices and a communication system used thereof.

BACKGROUND OF THE INVENTION

With development of technologies, there are an increasing number of communication devices that are equipped with more powerful communication capacities. A variety of wearable intelligent devices are now growing rapidly in the marketplace.

Wearable intelligent devices are portable devices that users can directly put on or wear or are capable of being integrated with clothes or accessories of the users.

Many wearable intelligent devices conduct communications with mobile phones of their users, who can access Internet or mobile communication network via the mobile phones. The wearable intelligent devices are usually connected to mobile phones via Bluetooth. Mobile phones can push some information to the wearable intelligent devices.

For example, Bluetooth earphones can transmit voice information of their users to mobile phones, then the mobile phones can forward the voice information to a mobile communication network. In another aspect, the mobile phones receive phone call signals from the mobile communication network, and forward corresponding data or signals to the Bluetooth earphones via Bluetooth link, and then the Bluetooth earphones emit sounds according to the forwarded data or signals. As a result, users can make or answer phone calls by means of communications established between the Bluetooth earphones and the mobile phones.

In addition to the function of making or answering phone calls, more and more data interactions can be done by means of communication between wearable intelligent devices and mobile phones.

Accordingly, wearable intelligent devices have become increasingly important. The question of how to realize seamless interconnection between wearable intelligent devices and smart phones is critical for further exploration of potential applications of these devices.

Currently, there are three mainstream technologies of wireless connection: Bluetooth, Wi-Fi and cellular network. However, data transmission via Bluetooth is subject to a limitation of a distance no more than 10 meters.

Mobile phones are usually equipped with the abovementioned three ways of connection. However, wearable intelligent devices are usually only equipped with Bluetooth connection.

When a wearable intelligent device is positioned from a mobile phone at a distance that is beyond the distance of Bluetooth communication, connection between the wearable intelligent device and the mobile phone is lost. In this case, the wearable intelligent device is no longer able to operate its communication functions. However, as the wearable intelligent device is actually equipped with elements such as a microphone, a loudspeaker or the like, it is suitable for use as a communication tool, for example, a Bluetooth earphone.

When a user only carries a wearable intelligent device, the wearable intelligent device that is unable to operate communication functions does not have much use. However, when a mobile phone is present, the user may expect that communications with the outside world can be established conveniently via either of the mobile phone alone or together with the wearable intelligent device.

Accordingly, it is a critical issue to provide a communication method, communication devices and a communication system, which allow a seamless connection between a mobile phone and a wearable intelligent device even if they are positioned quite far away from each other.

SUMMARY OF THE INVENTION

One of the technical problems, which the present invention intends to resolve, is to provide a first computing device, a communication method between the first computing device and a second computing device and a communication system thereof, so that a seamless connection between the first computing device and the second computing device can be established even if they are positioned quite far away from each other.

In one aspect, the present invention provides a method for a first computing device to conduct communication with a second computing device, wherein both the first computing device and the second computing device comprising: a first communication link mode, configured to communicate with each other directly when the second computing device is at a first range with respect to the location of the first computing device; and a second communication link mode, configured to communicate with each other indirectly via a server when the second computing device is at a second range with respect to the location of the first computing device, wherein the second range is greater than the first range, and the server is external to the first computing device. The method comprising: establishing a direct communication with the second computing device through the first communication link mode; determining that the first communication link mode is disconnected; establishing a link of the second communication link mode with the server; receiving outside data by the first computing device from a third device or Internet or a cellular network; packaging the outside data into data addressed to the second computing device; and transmitting the data addressed to the second computing device to the server by the second communication link mode.

Preferably, the method may further comprise: receiving data transmitted from the second computing device by the second communication link mode; extracting data addressed to the third device or Internet or a cellular network from the data transmitted from the second computing device; and transmitting the data addressed to the third device or Internet or the cellular network to the third device or Internet or the cellular network.

Preferably, the method may further comprise: determining that the first communication link mode is re-established; disconnecting the second communication link mode with the server.

Preferably, the method may further comprise: transmitting a signal that the first communication link mode has been disconnected to the server by the second communication link mode; or receiving a signal that the first communication link mode has been disconnected from the server by the second communication link mode.

Preferably, the method may further comprise: transmitting a departure signal to a third device indicating that the second computing device is moved outside of the first range from the first computing device.

Preferably, the data addressed to the second computing device may comprise an identification code of the second computing device.

Preferably, the data addressed to the second computing device may comprise an instruction with respect to the second computing device, which is generated by the first computing device in response to change in the movement status of the first computing device or a user's operation on the first computing device.

Preferably, the first computing device can be a mobile phone, and the second computing device can be a wearable intelligent device.

Preferably, the first communication link mode may be Bluetooth link mode, and the second communication link mode may be Wi-Fi link mode or a cellular network link mode.

In another aspect, the present invention provides, a first computing device conducting communication with a second computing device, wherein both the first computing device and the second computing device comprising: a first communication link mode, configured to communicate with each other directly when the second computing device is at a first range with respect to the location of the first computing device; and a second communication link mode, configured to communicate with each other indirectly via a server when the second computing device is at a second range with respect to the location of the first computing device, wherein the second range is greater than the first range, and the server is external to the first computing device. The first computing device comprising: a link mode switching element for, in response to link disconnection information of a first communication link mode between the first computing device and a second computing device, switching the communication between the first computing device and the second computing device from the first communication link mode to the second communication link mode, so that the first computing device receives data transmitted from the second computing device from a server and/or transmits data addressed to the second computing device to the server by a second communication link mode, a data receiving element for receiving outside data from a third device or Internet or a cellular network; and a data packaging element for packaging the outside data into the data addressed to the second computing device.

Preferably, the first computing device may further comprise: a data extracting element for extracting data addressed to a third device or Internet or a cellular network from the data transmitted from the second computing device; and a data transmitting device for transmitting the data addressed to a third device or Internet or a cellular network to the third device or Internet or the cellular network.

Preferably, the first computing device may further comprise: a second link establishing element for, in response to link disconnection of the first communication link mode between the first computing device and the second computing device, establishing a link of the second communication link mode with a server.

Preferably, the first computing device may further comprise: a second link disconnecting element for, in response to reestablishment of a link of the first communication link mode between the first device and the second device, disconnecting the link of the second communication link mode with the servers.

Preferably, the first computing device may further comprise: a link disconnection signal transmitting element for transmitting signals of disconnection of the first communication link mode to a server by the second communication link mode; or a link disconnection signal receiving element for receiving signals of disconnection of the first communication link mode from a server by the second communication link mode.

Preferably, the first computing device may further comprise: a departure signal transmitting element for, in response to receiving a signal of disconnection of the first communication link mode from a server, transmitting a departure signal to a third device indicating that the second computing device is moved away from the first computing device.

Preferably, the data addressed to the second computing device may comprise an identification code of the second computing device.

Preferably, the data addressed to the second computing device may comprise an instruction with respect to the second computing device which is generated in response to a change in the movement status of the first computing device or a user's operation on the first computing device.

Preferably, the second computing device may be a wearable intelligent device, and the first computing device may be a mobile phone.

Preferably, the first communication link mode may be a Bluetooth link mode, and the second communication link mode may be a Wi-Fi link mode or a cellular network link mode.

In a further aspect, the present invention provides a communication system comprising a first computing device and a second computing device; wherein the first computing device conducts communications with Internet or a cellular network, and the second computing device is capable of being connected to the first computing device via a first communication link mode and capable of being connected to the first computing device through a server via a second communication link mode, thereby conducting communications with Internet or a cellular network via the first computing device; in response to link disconnection of the first communication link mode between the first computing device and the second computing device, communication between the first computing device and the second computing device is established via a server by the second communication link mode.

By means of the communication method, the communication devices and the communication system provided by the present invention, establishment of a seamless connection between a first computing device and a second computing device becomes possible even if the first computing device and the second computing device are positioned far away from each other so that a first communication link mode (e.g., Bluetooth) is unable to be established in a traditional way because of the distance.

DETAILED DESCRIPTION OF THE INVENTION

The communication method, devices, and communication system provided herein by the present invention are to be described in detail in conjunction with the appended drawings.

The communication system and communication system according to the present invention are to be described by taking a mobile phone and a wearable intelligent device as examples.

In the present invention, in addition to the traditional Bluetooth link mode, a wearable intelligent device is further equipped with Wi-Fi and/or a cellular network link mode. As such, the wearable intelligent device and the mobile phone have substantially identical communication functions.

In the present invention, data interactions between a wearable intelligent device and a mobile phone may be symmetrical; namely, it is viable to transmit data from a wearable intelligent device to a mobile phone or to transmit data from a mobile phone to a wearable intelligent device. Herein, data may comprise instructions.

The data processing capacity of wearable intelligent devices is usually not as powerful as that of mobile phones. Besides, mobile phones are already registered to websites or mobile communication companies. As a result, communications with outside world (e.g., Internet or a cellular network) are made mainly via mobile phones.

Although a wearable intelligent device can also conduct communications with a server (e.g., which may be a cloud server) via access point (AP) of Wi-Fi and/or a cellular network, so as to conduct communications with a mobile phone. However, the server here means a server provided exclusively by the service provider of the wearable intelligent device. The server is only intended to forward data between the mobile phones and the wearable intelligent device.

Figure 1:
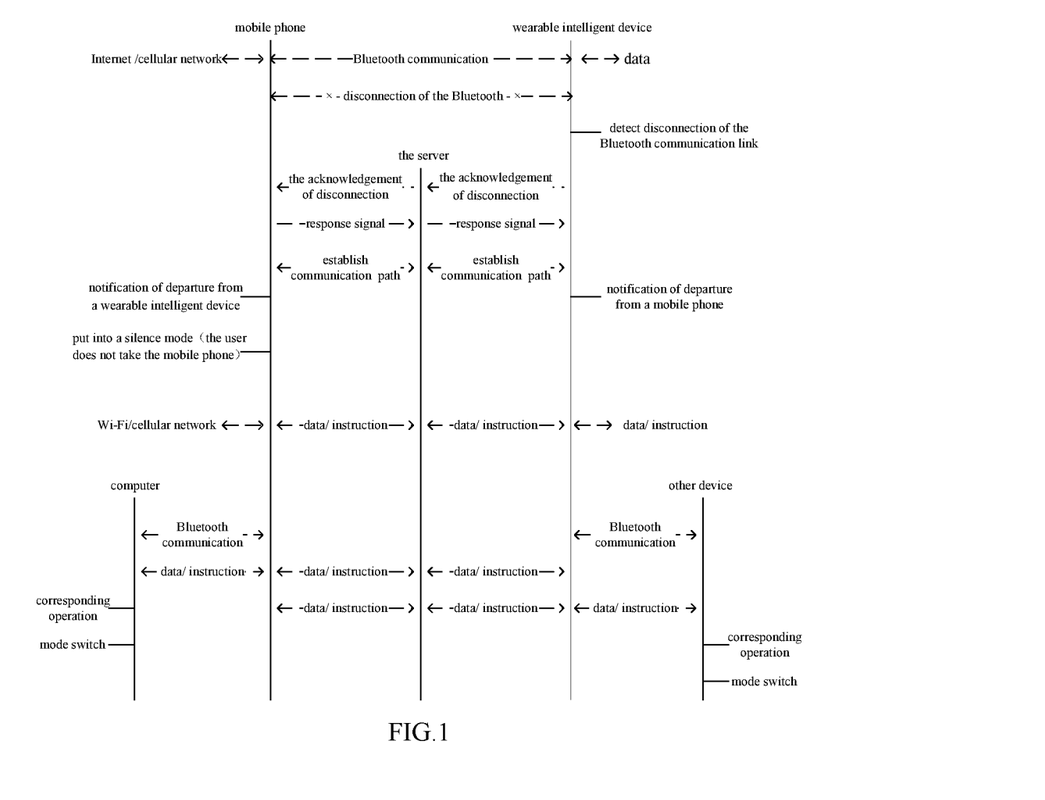
FIG. 1 illustrates a flowchart of a communication method according to the present invention.

As shown in FIG. 1, when the distance between a mobile phone and a wearable intelligent device is close, a Bluetooth communication link is established between the mobile phone and the wearable intelligent device.

The mobile phone conducts communications with the outside world via Wi-Fi and/or a cellular network. The wearable intelligent device conducts communication with the mobile phone by the Bluetooth link mode. Accordingly, the wearable intelligent device is further allowed to conduct communications with the outside world via the mobile phone.

In certain circumstances, a mobile phone and a wearable intelligent device may be moved far away from each other. For example, it may be the case that a user carries the mobile phone but do not carry the wearable intelligent device with him/her; or, it may be that a user carries the wearable intelligent device with him/her but has left the mobile phone behind.

When the distance between a mobile phone and a wearable intelligent device is so great that exceeds the maximum distance for establishing a Bluetooth communication link between the two, then the Bluetooth communication link between the mobile phone and the wearable intelligent device is lost.

In this case, the mobile phone and the wearable intelligent device may respectively detect disconnection of the Bluetooth communication link.

Alternatively, it is also viable to enable only one of the two devices to detect disconnection of the Bluetooth communication link, while a notification of disconnection is to be given to the other device by other means.

For example, FIG. 1 illustrates an event where a wearable intelligent device detects disconnection of a Bluetooth link.

In this case, a notification of departure from a mobile phone can be given on the wearable intelligent device by means of voice or text or another method as appropriate. For example, when movement of the wearable intelligent device is sensed by means of a movement sensor, it is predictable that the user carries the wearable intelligent device and moves away from the mobile phone. In this case, the user may be reminded that the mobile phone has been behind.

In another aspect, a communication link may be established between a wearable intelligent device and a (cloud) server through Wi-Fi or a cellular network.

The wearable intelligent device transmits an acknowledgement signal of disconnection of the Bluetooth communication link to the server.

A communication link is established between the server and the mobile phone through Wi-Fi or a cellular network.

The server forwards the acknowledgement signal of disconnection of the Bluetooth communication link to the mobile phone.

The mobile phone transmits a response signal to the server.

In this case, a notification of departure by the wearable intelligent device can be given to the mobile phone by means of voice or text or another method as appropriate. It is ascertainable that the user carries the mobile phone away from the wearable intelligent device when a movement sensor senses movement of the mobile phone, or when the wearable intelligent device is noticed as motionless from the acknowledgement signal of disconnection from the wearable intelligent device. In this case, the user may be reminded by means of voice or text that the wearable intelligent device has been left behind.

Alternatively, it is ascertainable that the user carries the wearable intelligent device away from the mobile phone when a motion sensor senses movement of the wearable intelligent device or when movement of the wearable intelligent device is noticed from the acknowledgement signal of disconnection from the wearable intelligent device. If the user does not return to take the mobile phone, then various notifications on the mobile phone, for example, the ringtone of the mobile phone and SMS, are meaningless; instead, these notifications may become noise to those around. Therefore, it is viable to change the operation mode of the mobile phone in this case; for example, the mobile phone may be put into a silence mode.

In another aspect, the server forwards the response signal from the mobile phone to the wearable intelligent device.

As a result, a new communication path between the mobile phone and the wearable intelligent device is established via the server. Data communication between the mobile phone and the wearable intelligent device can continue. Accordingly, seamless interconnection between the mobile phone and the wearable intelligent device is made possible.

In this case, although the mobile phone and the wearable intelligent device are positioned far apart and the Bluetooth communication link between the two is disconnected, a communication relayed by the server is established between the two by Wi-Fi or a cellular network.

The mobile phone is still connected to the outside world by Wi-Fi or a cellular network and is capable of receiving data from or transmitting data to the outside world.

Then, data interactions between the mobile phone and the wearable intelligent device are conducted, while data interactions between the wearable intelligent device and the server are also conducted. As such, the mobile phone may transmit data to the wearable intelligent device, and the wearable intelligent device may also transmit data to the mobile phone.

Between the mobile phone and the wearable intelligent device, data transmitted from one of the devices to the other may comprise an identification code of the other device, so that the server can directly know the device to which the data should be forwarded.

Alternatively, identification codes of the mobile phone and the wearable intelligent device may be saved correspondingly in a database on the server. When the server receives data from a device, it can determine whichever device corresponding to the device that has transmitted the data by retrieving the database, so as to determine device to which the data is to be forwarded.

Additionally, when it is ascertained that the user carries the wearable intelligent device away from the mobile phone, both the mobile phone and the wearable intelligent device can further establish a communication link with another intelligent device, which for example may be a wired link or a Wi-Fi link (e.g., Bluetooth link).

For example, a mobile phone may be connected to a computer by a Bluetooth link mode or a wire link mode, while the wearable intelligent device (e.g., an intelligent watch) may be connected to another accessory (e.g. a Bluetooth earphone) by a Bluetooth link mode.

In this way, the mobile phone is capable of conducting data interactions with such accessories as Bluetooth earphone via the server and the wearable intelligent device, while the wearable intelligent device is capable of conducting data interactions with a computer via the server and the mobile phone. For example, the user is still able to use a Bluetooth earphone to realize the function of making phone calls via the wearable intelligent device, the server and the mobile phone. Alternatively, the user is also able to use the wearable intelligent device to control the computer via the server and the mobile phone so as to realize data interactions with the computer. Or, vice versa, the user may use the computer to control the wearable intelligent device via the mobile phone and the server.

In another aspect, as described above, by using the motion sensor of each individual device, the movement status of the mobile phone and/or the wearable intelligent device can be detected and therefore which device is carried by the user and which device is departed away from the other device can be determined. It is viable to transmit an instruction to switch mode to the device that has been left behind by the user.

Still in another aspect, at the time of detecting a failure to establish a Bluetooth link (the first communication link mode) because of the distance between the mobile phone and the wearable intelligent device (the first computing device and the second computing device), if it is unable to ascertain whichever device is carried by the user and whichever device is left behind by the user through detecting the movement status of the mobile phone and/or the wearable intelligent device (i.e. the first computing device and the second computing device) using the motion sensors of these respective devices, and neither the mobile phone nor the wearable intelligent device (i.e. the first computing device and the second computing device) receives an instruction or information for ascertaining whichever device is carried by the user, then it is probably appropriate not to establish a new link between the mobile phone and the wearable intelligent device (i.e. the first computing device and the second computing device) via the server by Wi-Fi or a cellular network (i.e. the second communication link mode).

For example, when it is ascertained that the wearable intelligent device is carried away from the mobile phone by the user, then it is viable for the mobile phone to transmit an instruction on mode switch to the computer that is connected to (wireless or wired) the mobile phone, and the computer may for example be put into the sleep mode.

Alternatively, for example, if it is ascertained that the mobile phone is carried by the user and moved away from the wearable intelligent device, then the wearable intelligent device may transmit an instruction on mode switch to another accessory, for example, a Bluetooth earphone, which is connected to (wireless or wired) the wearable intelligent device, then the Bluetooth earphone may for example be put into the sleep mode. Likewise, the wearable intelligent device may also switch mode, for example, into the sleep mode.

Additionally, when the user carries one of the mobile phone or the wearable intelligent device away from the other and then returns so that the distance between the two devices becomes close enough for re-establishing a Bluetooth communication link, then the Bluetooth communication link is reestablished between these two devices, then they can conduct data interactions by the Bluetooth link mode.

The communication mode between the wearable intelligent device and the mobile phone is to be described in detail in conjunction with FIG. 1.

Herein below, the communication method between these two devices is to be described in terms of one of these devices in conjunction with FIG. 1.

Since both the wearable intelligent device and the mobile phone are equipped with communication functions by Bluetooth, Wi-Fi and a cellular network, communication functions operated between the two exhibits much asymmetry. Herein below, a mobile phone or a wearable intelligent device is referred to as a first computing device and a second computing device, and the method according to the present invention is to be described in terms of the first computing device.

Without any special specification, the first computing device may be a mobile phone or a wearable intelligent device. Accordingly, when the first computing device is a mobile phone, then the second computing device may be a wearable intelligent device; when the first computing device is a wearable intelligent device, then the second computing device is a mobile phone. Of course, the first computing device and the second computing device may also be any other device equipped with communication functions.

Both the first computing device and the second computing device comprising a first communication link mode and a second communication link mode.

The first communication link mode is configured to communicate between the first and second computing device directly when the second computing device is at a first range with respect to the location of the first computing device.

The second communication link mode is configured to communicate between the first and second computing device indirectly via a server when the second computing device is at a second range with respect to the location of the first computing device. The second range is greater than the first range, and the server is external to the first computing device.

In the method for the first computing device to communicate with a second computing device, according to the present invention, a second communication link mode is established in response to the link disconnection of the first communication link mode between the first computing device and the second computing device, to transmit data from the second computing device is through a server and/or send data addressed to the second computing device is through the server.

The first communication link mode may be, for example, Bluetooth link mode.

The second communication link mode may be, for example, a Wi-Fi link mode (Wi-Fi) or a cellular network link mode.

The second communication link mode between the first computing device and the second computing device can be maintained all the time.

Alternatively, it is also viable to establish a link of the second communication link mode between the first computing device and the second computing device in response to a link disconnection of the first communication link mode between the first computing device and the second computing device.

Figure 2:
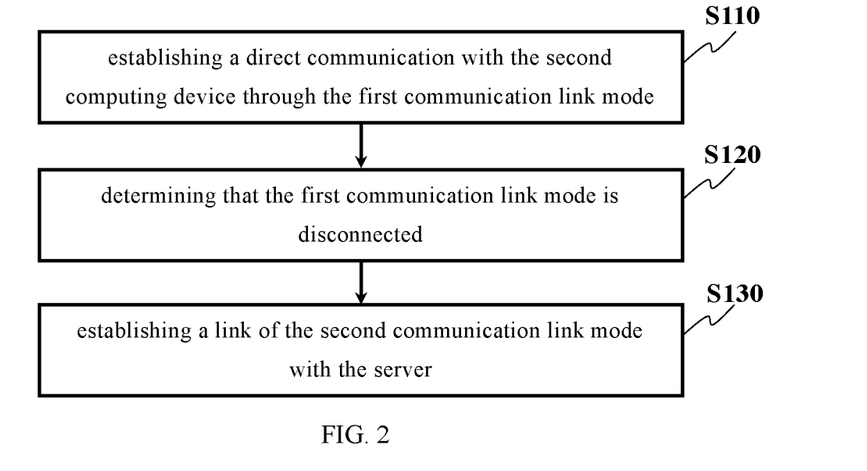
FIG. 2 illustrates a flowchart of an exemplified process of switching from the first communication link mode to the second communication link mode.

FIG. 2 illustrates a flowchart of an exemplified process of switching from the first communication link mode to the second communication link mode.

In step S110, a direct communication with the second computing device through the first communication link mode is established.

In step S120, it is determined the first communication link mode is disconnected.

In step S130, a link of the second communication link mode with the server is established. Thus, the communication link mode between the first computing device and the second computing device is switched. Thus, the first computing device can receive data transmitted from the second device from the server and/or transmitting data addressed to the second device to the server by the second communication link mode.

Figure 3:
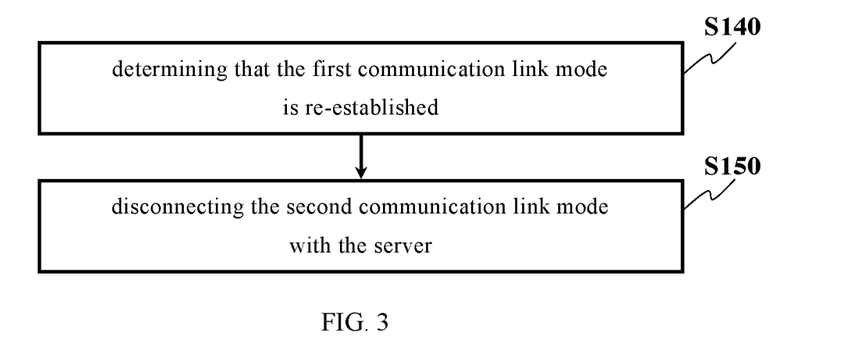
FIG. 3 illustrates a flowchart of an exemplified process of disconnecting the second communication link mode.

FIG. 3 illustrates a flowchart of an exemplified process of disconnecting the second communication link mode.

When the distance between the first computing device and the second computing device is again reduced to be close enough for re-establishing the first communication link mode, in step S140, it can be determined that the first communication link mode between the first computing device and the second computing device is re-established.

And then, in step S150, the link of the second communication link mode with the server may be disconnected.

Alternatively, the link of the second communication link mode may be maintained, but data interactions may be done not by this link mode.

When it is the first computing device that detects a link disconnection of the first communication mode, the first computing device may transmit a signal of disconnection of the first communication link mode to the server by the second communication link mode. Then, the server forwards the signal of disconnection of the first communication link mode to the second computing device. As such, link disconnection of the first communication link mode is thus acknowledged, and the first computing device and the second computing device establish a link of the second communication link mode with the server, respectively.

Alternatively, when it is the second computing device that detects a link disconnection of the first communication mode, the first computing device may, by the second communication link mode, receive from the server a signal of disconnection of the first communication link mode transmitted from the second computing device. The link disconnection of the first communication is thus acknowledged, and the first computing device and the second computing device establish a link of the second communication link mode with the server, respectively.

Additionally, in response to receiving the signal of disconnection of the first communication link mode from the server, a departure signal, which indicates that the second computing device is moved away from the first computing device, may be transmitted to a third device connected to the first computing device through wired or wireless connection.

For example, when it is detected by a motion sensor on the first computing device and/or the second computing device that a user carries the second computing device away from the first computing device, it is accordingly ascertainable that the user moves away from the third device as well. In this case, when the third device receives the departure signal, the third device may conduct a mode switch; for example, it may go into the sleep mode.

Alternatively, when for example it is ascertained that the user carries the first computing device away from the second computing device, a mode switch from corresponding function or operation in relation to the second computing device that is running on the third device can be made; for example, the function or operation in relation to the second computing device may be suspended.

Alternatively, for example, the third device and the second computing device are initially connected by Bluetooth or the like. However, when the user carries the first computing device and the third device away from the second computing device at the same time, the first computing device may send a departure signal to the third device, which then switches its operation mode. The third device thus switches to conduct data interactions with the second computing device by means of forwarding done by the first computing device and the server.

For example, the third device may be a Bluetooth earphone, the second computing device may be a mobile phone, and the first computing device may be a wearable intelligent device (e.g., an intelligent watch). When the three are positioned relatively close to each other, the Bluetooth earphone is connected to the mobile phone via Bluetooth. A user makes or answers phone calls through the Bluetooth earphone via the mobile phone. When the user carries the wearable intelligent device and the Bluetooth earphone away from the mobile phone, the Bluetooth earphone, in response to the departure signal, switches the Bluetooth link between itself and the mobile phone to the Bluetooth link between itself and the wearable intelligent device, so that the Bluetooth earphone can conduct data interactions with the mobile phone by means of forwarding done by the wearable intelligent device and a server so as to be capable of continuously conducting phone-call making functions.

Figure 4:
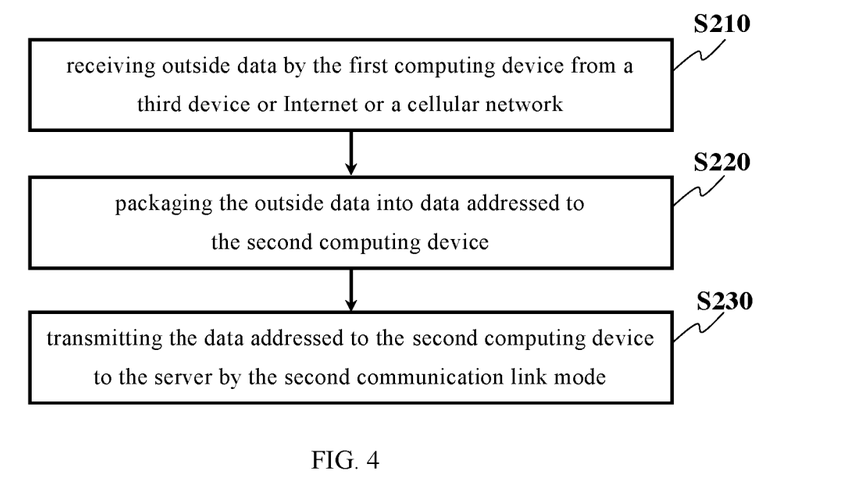
FIG. 4 illustrates a flowchart of an exemplified process of forwarding outside data to the second computing device by the first computing device through the second communication link mode.

FIG. 4 illustrates a flowchart of an exemplified process of forwarding outside data to the second computing device by the first computing device through the second communication link mode.

In step S210, outside data is received by the first computing device from a third device or Internet or a cellular network.

In step S220, the first computing device packages the outside data into data addressed to the second computing device Then, in step S230, the first computing device transmits the data addressed to the second computing device to the server by the second communication link mode.

In this way, the first computing device severs as a gateway or a router by forwarding outside data to the second computing device by the first computing device through the second communication link mode.

Figure 5:
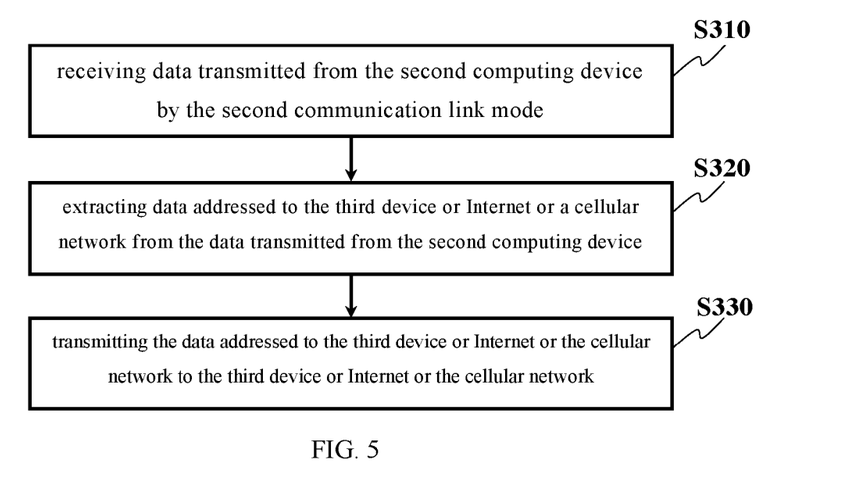
FIG. 5 illustrates a flowchart of an exemplified process for the first computing device to forward the data transmitted through the second communication link mode from the second computing device.

FIG. 5 illustrates a flowchart of an exemplified process for the first computing device to forward the data transmitted through the second communication link mode from the second computing device.

In step S310, the first computing device receives data transmitted from the second computing device by the second communication link mode.

In step S320, the first computing device extracts data addressed to the third device or Internet or a cellular network from the data transmitted from the second computing device.

And then, in Step S330, the first computing device transmits the data addressed to the third device or Internet or the cellular network to the third device or Internet or the cellular network.

In this way, the first computing device severs as a gateway or a router by forwarding the data transmitted through the second communication link mode from the second computing device to the third device or Internet or the cellular network.

In order for a server to accurately forward data to a second computing device that pairs with the first computing device, data addressed to the second computing device, which is to be transmitted to the server, may comprise an identification code of the second computing device. When the server receives data from the first computing device, it can find out from the data the exact second computing device to which the data should be forwarded.

When the user carries the first computing device away from the second computing device, data addressed to the second computing device, which is to be transmitted to the server, may comprise an instruction with respect to the second computing device that is generated in response to a change of movement status of the first computing device or the user's operation on the first computing device.

The change of movement status of the first computing device may be sensed by a motion sensor on the first computing device. The change of movement status may indicate that the user carries the first computing device. On the basis of this information, a relevant instruction may be transmitted to the second computing device that has been left behind by the user, for example, instructing the second computing device to go into the sleep mode or the silence mode, or the like.

In another aspect, since the user carries the first computing device, the user may perform operations on the first computing device, for example, pressing keys. The second computing device may be controlled, for example, switching its operation mode, by forwarding instructions generated in this way to the second computing device by the server.

Not only the first computing device and the second computing device may conduct communications by means of forwarding done by a server, but also the first computing device may further conduct communications with a third device or Internet or a cellular network, receive outside data from the third device, Internet or the cellular network, package the outside data into data addressed to the second computing device and send the same to a server, by which the data is forwarded to the second computing device.

In another aspect, data addressed to a third device or Internet or a cellular network may be extracted from data from the second computing device (forwarded by a server). Then, the data addressed to the third device or Internet or the cellular network is transmitted to the third device or Internet or the cellular network.

Generally speaking, mobile phones are capable of conducting communications with Internet or a cellular network. Accordingly, the first computing device may be a mobile phone when it is necessary to conduct communications with Internet or a cellular network.

Herein below, the device capable of conducting communications according to the present invention is to be described in conjunction with FIG. 6 to FIG. 9. Generally speaking, for the sake of convenience in description, the device is referred to as the first computing device, which is capable of conducting communications with a second computing device.

Figure 6:
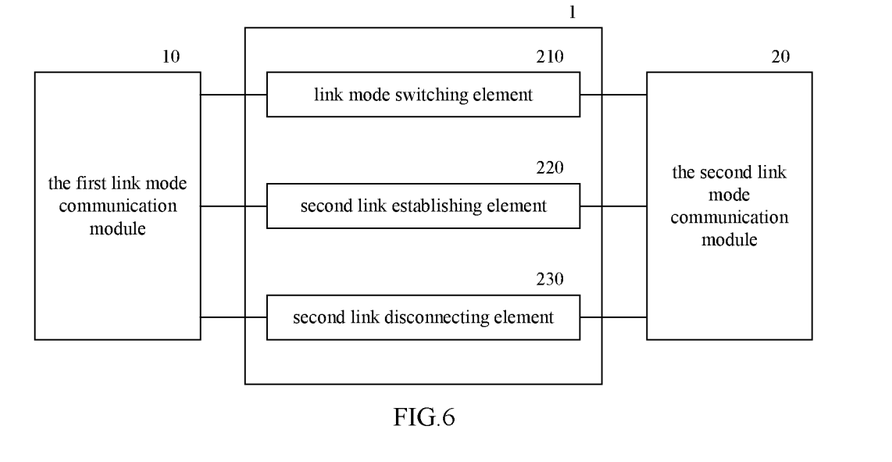
FIG. 6 to FIG. 9 illustrate respectively an illustrative diagram of elements that may be comprised in the communication devices according to the present invention.

As shown in FIG. 6, the first computing device 1 may comprise a link mode switching element 210.

In response to link disconnection of a first communication link mode between a first computing device and a second computing device, the link mode switching element 210 switches the communication between the first computing device and the second computing device from the first communication link mode to the second communication link mode, so that the first computing device receives data transmitted from the second computing device from a server and/or transmits data addressed to the second computing device to the server by a second communication link mode. Namely, communications with the second computing device are no longer conducted by means of a first link mode communication module 10; instead, communications with the second computing device are conducted via a server by means of a second link mode communication module 20.

In this case, the first communication link mode may be Bluetooth link mode, while the second communication link mode may be a Wi-Fi link mode or a cellular network link mode.

The first computing device can sever as a gateway or a router between the second computing device and a third device or Internet or a cellular network. This will be described with respect to FIG. 9 later.

In addition, the first computing device 1 may further comprise a second link establishing element 220 and a second link disconnecting element 240.

In response to link disconnection of the first communication link mode between the first computing device and the second computing device, the second link establishing element 220 establishes a link of the second communication link mode with a server.

In response to reestablishment of connection of the first communication link mode between the first computing device and the second computing device, the second link disconnecting element 230 disconnects the link of the second communication link mode with a server.

In FIG. 6, the first link mode communication module 10 and the second link mode communication module 20 are not incorporated in the first computing device 10. In fact, the first link mode communication module 10 and the second link mode communication module 20 may also be incorporated in the first computing device 1.

FIG. 3 illustrates an exemplary diagram of an element for making notifications between the first computing device and the second computing device when link disconnection of the first communication link mode is detected.

Figure 7:
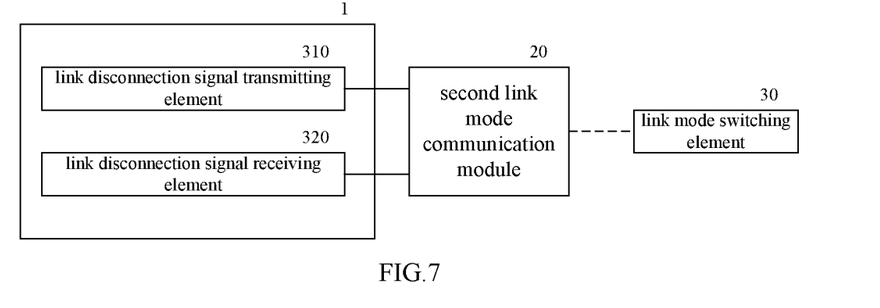

As shown in FIG. 7, the first computing device 1 may further comprise a link disconnection signal transmitting element 310 and/or a link disconnection signal receiving element 320.

When the first computing device detects link disconnection of the first communication link mode, the link disconnection signal transmitting element 310 transmits a signal of disconnection of the first communication link mode to a server 30 by the second communication link mode.

When the second computing device detects link disconnection of the first communication link mode, the link disconnection signal receiving element 320 receives a signal of disconnection of the first communication link mode from the server 30 by the second communication link mode.

The first computing device and the second computing device may otherwise detect respectively whether or not the link of the first communication link mode is disconnected; in this case, it is not necessary to provide the link disconnection signal transmitting element 310 or the link disconnection signal receiving element 320.

Figure 8:
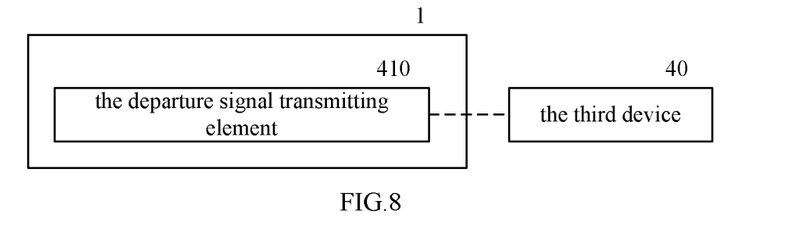

FIG. 8 shows an exemplary diagram of the first computing device being used to conduct interactions with a third device when link connection of the first communication link mode between the first computing device and the second computing device is disconnected.

As shown in FIG. 8, the first computing device 1 may further comprise a departure signal transmitting element 410.

In response to receiving the signal of disconnection of the first communication link mode from the server 30, the departure signal transmitting element 410 transmits a departure signal to a third device 40 indicating that the second computing device is moved away from the first computing device.

As stated in the description of the communication method according to the present invention in conjunction with FIG. 1, data addressed to the second computing device may comprise an identification code of the second computing device. Alternatively, the identification codes of the first computing device and the second computing device may be saved correspondingly in a database on the server 30, which thence enables the server 30 to, by retrieving its database, determine whichever second/first computing device the data from the first/second computing device is to be forwarded to.

The data addressed to the second computing device may comprise an instruction with respect to the second computing device that is generated in response to a change of movement status of the first computing device or the user's operation on the first computing device.

It can be ascertained whether a user carries the first computing device away from the second computing device or carries the second computing device away from the first computing device through detecting changes to the movement status of the first computing device. On this basis, it can be determined whatever data and instructions should be transmitted to the second computing device.

In addition, when the user carries the first computing device away from the second computing device, the second computing device may be controlled through conducting operations on the first computing device.

Figure 9:
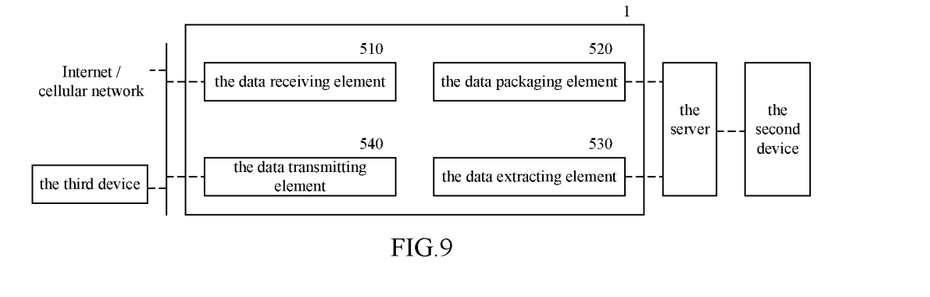

FIG. 9 shows an exemplary diagram of elements that the first computing device may further comprise in the case the first computing device and the second computing device conduct communications by a second communication link mode.

As shown in FIG. 9, the first computing device 1 may further comprise a data receiving element 510 and a data packaging element 520.

The data receiving element 510 receives outside data from a third device 40 or Internet or a cellular network.

The data packaging element 520 packages the outside data into data addressed to the second computing device 50.

In the case the first computing device is a mobile phone and the second computing device is a wearable intelligent device, the first computing device may (via the server 30) forwards the outside data from Internet or a cellular network to the second computing device.

In addition, the first computing device 1 may further comprise a data extracting element 530 and a data transmitting element 540.

The data extracting element 530 extracts the data addressed to the third device 40 or Internet or a cellular network from the data sent from the second computing device 50 (via the server 30).

The data transmitting element 540 transmits the data addressed to the third device 40 or Internet or the cellular network to the third device 40 or Internet or the cellular network.

In the case the first computing device is a mobile phone and the second computing device is a wearable intelligent device, the first computing device may receive data addressed to Internet or a cellular network from the second computing device 50 (via the server 30) and transmits the data addressed to Internet or the cellular network to Internet or the cellular network.

As is known from the foregoing description, the present invention further provides a communication system. The communication system comprises a first computing device and a second computing device.

The first computing device is capable of conducting communications with Internet or a cellular network; for example, the first computing device may be a mobile phone.

The second computing device is capable of being connected to the first computing device by a first communication link mode, and is also capable of being connected to the first computing device via a server by a second communication link mode, thereby conducting communications with Internet or a cellular network via the first computing device; for example, the second computing device may be various wearable intelligent devices.

In response to link disconnection of a first communication link mode between the first computing device and the second computing device, communications between the first computing device and the second computing device are conducted via a server by the second communication link mode.

Some details of the communication mode between the first computing device and the second computing device may be same as those described above in conjunction with FIG. 1 to FIG. 9.

Here below, some application embodiments of the communication system according to the present invention are to be further described in conjunction with FIG. 10 to FIG. 13, with a mobile phone and a wearable intelligent device being referred to respectively as a first computing device and a second computing device, and the first communication link mode being exemplified by Bluetooth link mode, and the second communication link mode being exemplified by Wi-Fi or a cellular network.

Some application embodiments of the communication system according to the present invention are illustrated in FIG. 10 to FIG. 13.

1. Scenarios where the wearable intelligent device is left behind are as follows:

Notifying the separation of the wearable intelligent device from the mobile phone.

Figure 10:
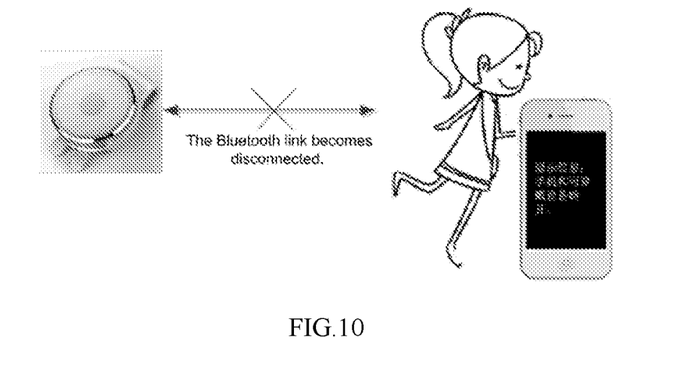
FIG. 10 to FIG. 13 illustrate respectively some implementation embodiments of the communication system according to the present invention.

As shown in FIG. 10, when a user carries the mobile phone only but leaves the wearable intelligent device behind, the wearable intelligent device is thus positioned far away from the mobile phone, then the Bluetooth link between the wearable intelligent device and the mobile phone becomes disconnected. When disconnection of the Bluetooth link is acknowledged, a notification message will be transmitted to the mobile phone indicating that the wearable intelligent device is far away from the mobile phone and the Bluetooth link is disconnected.

2. Scenarios where the wearable intelligent device is carried are as follows:

The application notification of the mobile phone (e.g. messages to the mobile phone) is forwarded to the wearable intelligent device.

Figure 11:
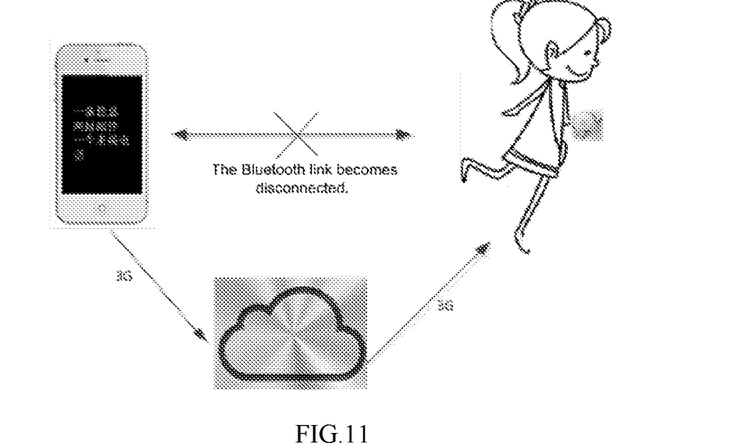

As shown in FIG. 11, when the Bluetooth link is disconnected along the wearable intelligent device being moved away from the mobile phone, the wearable intelligent device transmits acknowledgement signal of a Bluetooth disconnection to a cloud server; the cloud server then forwards the acknowledgement signal to the mobile phone. Upon receiving the acknowledgement signal, the mobile phone forwards application notifications to the mobile phone (e.g., phone calls, short messages, emails, etc.) via the cloud server to the wearable intelligent device by wireless access point (AP) of Wi-Fi or a cellular network. In this way, the wearable intelligent device can instantly receive information to the mobile phone.

As a result, even if the user moves away from the mobile phone, the user still can conduct operations of receiving/sending messages by means of the wearable intelligent device.

Turn off the ringtone of the mobile phone

Figure 12:
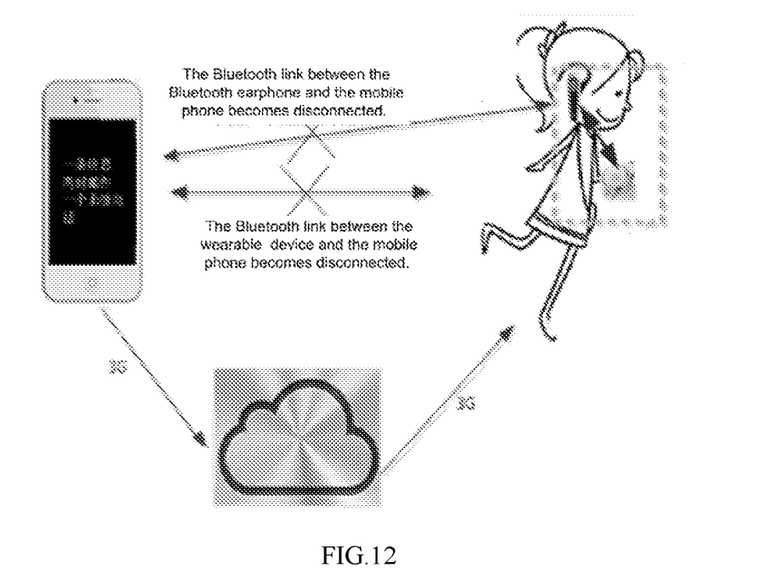

As shown in FIG. 11, after it is acknowledged that the wearable intelligent device is carried away from the mobile phone, application notifications to the mobile phone (e.g., phone calls, short messages, emails, etc.) are transmitted to the wearable intelligent device via the cloud server. In this case, the ringtone of the mobile phone upon receiving application notifications will be turned off Connection with other accessories (e.g. a Bluetooth earphone) is switched to the wearable intelligent device As shown in FIG. 12, the Bluetooth link between the wearable intelligent device and the mobile phone becomes disconnected when the user carries the wearable intelligent device away from the mobile phone. Upon acknowledging the Bluetooth disconnection, the accessory (e.g. a Bluetooth earphone, etc.) that has been initially connected with (e.g. carried with by the user) the mobile phone is now disconnected from the mobile phone. In this case, if the accessory (e.g. a Bluetooth earphone) of the mobile phone is positioned closer to the wearable intelligent device, then the accessory (e.g. a Bluetooth earphone) automatically establishes a Bluetooth link with the wearable intelligent device.

The Bluetooth earphone is connected to the wearable intelligent device via the Bluetooth link and then connected to the mobile phone via the wearable intelligent and the cloud server.

In this way, even if the user (and the Bluetooth earphone carried with by the user) moves far away from the mobile phone, the user still can conduct operations of making/answering a phone call by means of the Bluetooth earphone.

Other intelligent devices connected to the mobile phone switches to another operation mode upon detecting that the wearable intelligent device is carried away.

Figure 13:
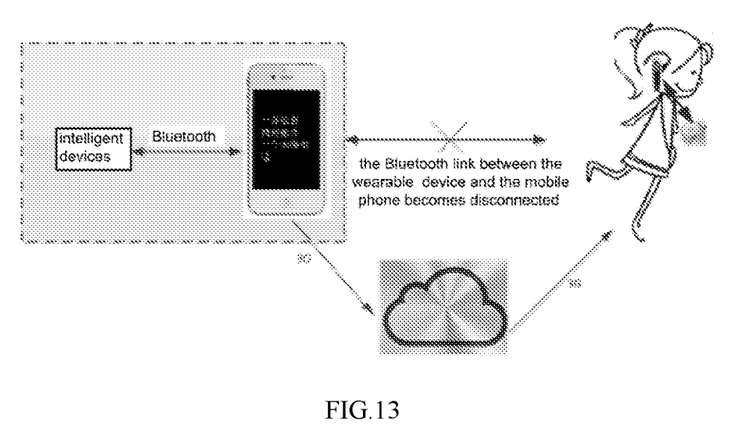

As shown in FIG. 13, other intelligent devices connected to the mobile phone (wired or wireless, Bluetooth or Wi-Fi), for example, a computer, may detect that the user is far away on the basis of information that the user carries the wearable intelligent device away. In this case, the intelligent device such as a computer may switch its operation mode, for example, into the sleep mode. Additionally, the intelligent device may alternatively terminate operations that require cooperation from the wearable intelligent device in response to the departure of the wearable intelligent device.

The communication method, the communication devices and the communication system provided according to the present invention are so far described in detail. However, it will be apparent to those skilled in the art that various alternations, substitutions and modifications can be made to the details of the disclosure without departing from the scope or spirit of the present invention. The scope of the present invention is as defined by the appended claims.

What is claimed is:

1. A method for a first computing device to conduct communication with a second computing device,
   wherein both the first computing device and the second computing device comprises:
      a first communication link mode, configured to communicate with each other directly when the second computing device is at a first range with respect to the location of the first computing device; and
      a second communication link mode, configured to communicate with each other indirectly via a server when the second computing device is at a second range with respect to the location of the first computing device,
      wherein the second range is greater than the first range, and the server is external to the first computing device,
   the method comprising:
      establishing a direct communication with the second computing device through the first communication link mode;
      determining that the first communication link mode is disconnected;
      establishing a link of the second communication link mode with the server;
      receiving outside data by the first computing device from a third device or Internet or a cellular network;
      packaging the outside data into data addressed to the second computing device, wherein the first computing device serves as a gateway or a router to the second computing device, forwarding outside data through the second communication link mode; and
      transmitting data addressed to the second computing device to the server by a second communication link mode.

2. The method according to claim 1, further comprising receiving data transmitted from the second computing device by the second communication link mode;

extracting data addressed to the third device or Internet or a cellular network from the data transmitted from the second computing device; and transmitting the data addressed to the third device or Internet or the cellular network to the third device or Internet or the cellular network.

3. The method according to claim 1, further comprising disconnecting the second communication link mode with the server.

4. The method according to claim 1, further comprising transmitting a signal that the first communication link mode has been disconnected to the server by the second communication link mode; or receiving a signal that the first communication link mode has been disconnected from the server by the second communication link mode.

5. The method according to claim 4, further comprising transmitting a departure signal to a third device indicating that the second computing device is moved outside of the first range from the first computing device.

6. The method according to claim 1, wherein the data addressed to the second computing device comprises an identification code of the second computing device.

7. The method according to claim 1, wherein the data addressed to the second computing device comprises an instruction with respect to the second computing device, which is generated by the first computing device in response to a change in movement status of the first computing device or a user's operation on the first computing device.

8. The method according to claim 1, wherein the first computing device is a mobile phone, and the second computing device is a wearable intelligent device.

9. The method of claim 1, wherein the first communication link mode is a Bluetooth link mode, and the second communication link mode is a Wi-Fi link mode or a cellular network link mode.

10. A first computing device conducting communication with a second computing device, wherein both the first computing device and the second computing device comprising:

a first communication link mode, configured to communicate with each other directly when the second computing device is at a first range with respect to the location of the first computing device; and a second communication link mode, configured to communicate with each other indirectly via a server when the second computing device is at a second range with respect to the location of the first computing device, wherein the second range is greater than the first range, and the server is external to the first computing device, the first computing device comprising:

a link mode switching element for, in response to link disconnection information of a first communication link mode between the first computing device and a second computing device, switching the communication between the first computing device and the second computing device from the first communication link mode to the second communication link mode, so that the first computing device receives data transmitted from the second computing device from a server and/or transmits data addressed to the second computing device to the server by a second communication link mode, a data receiving element for receiving outside data from a third device or Internet or a cellular network; and a data packaging element for packaging the outside data into the data addressed to the second computing device, wherein the first computing device serves as a gateway or a router to the second computing device, forwarding outside data through the second communication link mode.

11. The first computing device according to claim 10, further comprising a second link establishing element for, in response to link disconnection of the first communication link mode between the first computing device and the second computing device, establishing a link of the second communication link mode with the server.

12. The first computing device according to claim 11, further comprising a second link disconnecting element for, in response to reestablishment of a link of the first communication link mode between the first computing device and the second computing device, disconnecting the link of the second communication link mode with the server.

13. The first computing device according to claim 10 further comprising a link disconnection signal transmitting element for transmitting signals of disconnection of the first communication link mode to the server by the second communication link mode; or a link disconnection signal receiving element for receiving signals of disconnection of the first communication link mode from the server by the second communication link mode.

14. The first computing device according to claim 13 further comprising a departure signal transmitting element for, in response to receiving a signal of disconnection of the first communication link mode from the server, transmitting a departure signal to a third device indicating that the second computing device is moved away from the first computing device.

15. The first computing device according to claim 10, wherein the data addressed to the second computing device comprises an identification code of the second computing device.

16. The first computing device according to claim 10, wherein the data addressed to the second computing device comprises an instruction with respect to the second computing device which is generated in response to a change to movement status of the first device or a user's operation on the first computing device.

17. The first computing device according to claim 10, wherein the second computing device is a wearable intelligent device, and the first computing device is a mobile phone.

18. The first computing device according to claim 10 further comprising a data extracting element for extracting data addressed to a third device or Internet or a cellular network from data from the second computing device; and a data transmitting device for transmitting data addressed to a third device or Internet or a cellular network to the third device or Internet or the cellular network.

19. The first computing device of anyone of claim 10, wherein the first communication link mode is a Bluetooth link mode, and the second communication link mode is a Wi-Fi link mode or a cellular network link mode.

20. A communication system comprising a first computing device and a second computing device, wherein:
  the first computing device conducts communications with Internet or a cellular network;
  the second computing device is capable of being connected to the first computing device via a first communication link mode and capable of being connected to the first computing device through a server via a second communication link mode, thereby performing communications with Internet or the cellular network via the first computing device; and
  in response to link disconnection of the first communication link mode between the first computing device and the second computing device, communications between the first computing device and the second computing device is conducted via a server by way of the second communication link mode.

* * * * *